(12) United States Patent
Ogura et al.

(10) Patent No.: US 12,295,276 B2
(45) Date of Patent: May 13, 2025

(54) AUTONOMOUS TRAVEL SYSTEM

(71) Applicant: Yanmar Power Technology Co., Ltd., Osaka (JP)

(72) Inventors: Kohei Ogura, Osaka (JP); Yasuto Nishii, Osaka (JP); Taiki Shirafuji, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 654 days.

(21) Appl. No.: 17/312,921

(22) PCT Filed: Oct. 4, 2019

(86) PCT No.: PCT/JP2019/039276
§ 371 (c)(1),
(2) Date: Jun. 10, 2021

(87) PCT Pub. No.: WO2020/121630
PCT Pub. Date: Jun. 18, 2020

(65) Prior Publication Data
US 2022/0022361 A1 Jan. 27, 2022

(30) Foreign Application Priority Data

Dec. 11, 2018 (JP) .................. 2018-231378

(51) Int. Cl.
*A01B 69/00* (2006.01)
*A01B 69/04* (2006.01)
*G05D 1/00* (2006.01)

(52) U.S. Cl.
CPC .......... *A01B 69/008* (2013.01); *G05D 1/0011* (2013.01); *G05D 1/0219* (2013.01)

(58) Field of Classification Search
CPC ...... A01B 69/008; G05D 1/00; G05D 1/0219; G05D 2201/0201; G05D 1/0088; G05D 1/0212
See application file for complete search history.

(56) References Cited

U.S. PATENT DOCUMENTS

2009/0240430 A1\* 9/2009 Sachs .................. A01B 79/005
  701/408
2010/0262342 A1\* 10/2010 Dix ...................... A01B 69/008
  701/50

(Continued)

FOREIGN PATENT DOCUMENTS

EP 2983050 A2 2/2016
JP 2018161085 A 10/2018

*Primary Examiner* — Anne Marie Antonucci
*Assistant Examiner* — Jordan T Smith
(74) *Attorney, Agent, or Firm* — Chris Mizumoto

(57) ABSTRACT

This autonomous travel system is provided with a farm field acquisition unit, a reference auxiliary line creation unit, an adjacent auxiliary line creation unit, and a travel control unit. The farm field acquisition unit acquires information regarding a farm field that includes a work area and a headland area. The reference auxiliary line creation unit creates first reference auxiliary lines within the headland area at positions spaced apart from the farm field peripheral edge on the inner side thereof by a first reference interval. The adjacent auxiliary line creation unit creates, at each of auxiliary line intervals, first adjacent auxiliary lines at positions spaced apart from the first reference auxiliary lines on the inner sides thereof. The total number of first reference auxiliary lines and first adjacent auxiliary lines created on the inner side of one predetermined side of the farm field peripheral edge is a value obtained by rounding up to a value equal to or less than the decimal of the headland width L/the auxiliary line interval S. The travel control unit causes a work vehicle to travel autonomously along at least some of (Continued)

the first reference auxiliary lines and the first adjacent auxiliary lines.

6 Claims, 14 Drawing Sheets

(56) References Cited

U.S. PATENT DOCUMENTS

| | | | |
|---|---|---|---|
| 2014/0081568 A1* | 3/2014 | Pieper | G05D 1/0274 |
| | | | 701/400 |
| 2015/0331423 A1* | 11/2015 | Volger | A01B 69/008 |
| | | | 701/25 |
| 2016/0174453 A1* | 6/2016 | Matsuzaki | A01B 69/00 |
| | | | 701/2 |
| 2017/0112044 A1 | 4/2017 | Stratton et al. | |
| 2017/0168501 A1* | 6/2017 | Ogura | G05D 1/0016 |
| 2018/0329620 A1 | 11/2018 | Cabrespine et al. | |
| 2018/0359905 A1* | 12/2018 | Foster | A01B 69/008 |

* cited by examiner

AUTONOMOUS TRAVEL SYSTEM

CROSS-REFERENCE

This application is a US National Stage Application under 35 U.S.C. § 371 of International Application No. PCT/JP2019/039276 filed Oct. 4, 2019, which claims foreign priority of JP2018-231378 filed Dec. 11, 2018, the disclosures of which are hereby incorporated by reference in their entirety.

TECHNICAL FIELD

The present invention mainly relates to an autonomous travel system for causing a work vehicle, on which a work machine is mounted, to travel along a path.

BACKGROUND ART

There is a case in which a farm field is divided into a work area, in which a work vehicle is caused to mainly travel straight to perform work, and a headland area, which is positioned around the work vehicle for turning the work vehicle, for example. In Patent Literature 1, there is described that a path on which a work vehicle is caused to autonomously travel is created in both of these kinds of work area and headland area.

CITATION LIST

Patent Literature

Patent Literature 1: Japanese Unexamined Patent Application Publication No. H11-266608

DISCLOSURE OF INVENTION

Problems to be Solved by the Invention

However, in Patent Literature 1, a specific creation method or a specific usage method of a path for a headland area is not described in detail. Since headland areas have different characteristics from work areas, the path creation method or usage method of a work area cannot be simply applied.

The present invention has been made in view of the above situation, and the main object thereof is to provide an autonomous travel system in which an auxiliary line that can be utilized as a path in a headland area is created, so that it is possible to cause a work vehicle to properly perform autonomous traveling in the headland area.

Means For Solving the Problems and Effect of the Invention

The problem to be solved by the present invention is as described above, and the means for solving this problem and the effect thereof will be explained in the following.

According to the first aspect of the present invention, an autonomous travel system having the following configuration is provided. That is, this autonomous travel system includes a farm field acquisition unit, a reference auxiliary line creation unit, an adjacent auxiliary line creation unit, and a travel control unit. The farm field acquisition unit obtains information of a farm field including a work area, in which a travel path for a work vehicle on which a work machine is mounted to autonomously travel to perform work is set, and a headland area, which is formed between the work area and a farm field peripheral edge. The reference auxiliary line creation unit creates a first reference auxiliary line in the headland area at a position that is distant inward from the farm field peripheral edge by a first reference interval, which is ½ of a work width or ½ of a work machine width. The adjacent auxiliary line creation unit creates a first adjacent auxiliary line at a position that is distant inward from the first reference auxiliary line by an auxiliary line interval, which is a value obtained by subtracting an overlap amount from the work width or a value obtained by adding a work interval to the work width. The total number of the first reference auxiliary line and first adjacent auxiliary lines to be created inside of a predetermined side of the farm field peripheral edge is a value obtained by rounding up decimal places of L/S if a headland width, which is a distance from the farm field peripheral edge to the work area, is L and the auxiliary line interval is S. The travel control unit causes the work vehicle to autonomously travel along at least a part of the first reference auxiliary line and first adjacent auxiliary lines.

Accordingly, by creating auxiliary lines with reference to the farm field peripheral edge and making the work vehicle autonomously travel along the auxiliary lines, it is possible to prevent remaining work from occurring in the headland area.

According to the second aspect of the present invention, an autonomous travel system having the following configuration is provided. That is, this autonomous travel system includes a farm field acquisition unit, a reference auxiliary line creation unit, an adjacent auxiliary line creation unit, and a travel control unit. The farm field acquisition unit obtains information of a farm field including a work area, in which a travel path for a work vehicle on which a work machine is mounted to autonomously travel to perform work is set, and a headland area, which is formed between the work area and a farm field peripheral edge. The reference auxiliary line creation unit creates a second reference auxiliary line in the headland area at a position that is distant outward from a work area peripheral edge by a second reference interval, which is a value obtained by subtracting an overlap amount from ½ of a work width or a value obtained by adding a work interval to ½ of the work width. The adjacent auxiliary line creation unit creates a second adjacent auxiliary line at a position that is distant outward from the second reference auxiliary line by an auxiliary line interval, which is a value obtained by subtracting the overlap amount from the work width or a value obtained by adding the work interval to the work width. The total number of the second reference auxiliary line and second adjacent auxiliary lines to be created outside of a predetermined side of the work area peripheral edge is a value obtained by rounding down decimal places of L/S or a value obtained by subtracting 1 from the value obtained by rounding down decimal places of L/S if a headland width, which is a distance from the farm field peripheral edge to the work area, is L and the auxiliary line interval is S. The travel control unit causes the work vehicle to autonomously travel along at least a part of the second reference auxiliary line and second adjacent auxiliary lines.

Accordingly, by creating auxiliary lines with reference to the work area peripheral edge and making the work vehicle to autonomously travel along the auxiliary lines, it is possible to keep a constant work pitch in the headland area.

In the autonomous travel system, the following configuration is preferable. That is, the reference auxiliary line creation unit is capable of creating the first reference auxiliary line and is capable of creating a second reference auxiliary line. The adjacent auxiliary line creation unit is capable of creating the first adjacent auxiliary line and is capable of creating a second adjacent auxiliary line. Furthermore, the autonomous travel system further includes an auxiliary line selection unit that selects the first reference auxiliary line and first adjacent auxiliary lines or selects the second reference auxiliary line and second adjacent auxiliary lines. The travel control unit causes the work vehicle to autonomously travel along at least a part of the auxiliary lines selected by the auxiliary line selection unit.

Accordingly, it is possible to make the work vehicle autonomously travel in the headland area, based on either auxiliary lines with reference to the farm field peripheral edge or auxiliary lines with reference to the work area peripheral edge.

In the autonomous travel system, it is preferable that, in a case where an interval between the second adjacent auxiliary line and the farm field peripheral edge is narrower than ½ of the work width or ½ of the work machine width, the adjacent auxiliary line creation unit does not create the second adjacent auxiliary line or deletes the second adjacent auxiliary line after creation.

Accordingly, it is possible to prevent a path on which the work machine makes contact with the farm field peripheral edge or a path on which the work is performed outside the farm field from being created.

In the autonomous travel system, the following configuration is preferable. That is, the autonomous travel system includes a selection processing unit that performs a process of allowing a user to select in which of the work area and the headland area the work is to be performed and a process of allowing the user to select whether the work in the headland is to be performed or the work is to be ended. In a case where it is determined that the user has selected the work in the headland area, the travel control unit causes the work vehicle to autonomously travel along at least a part of the auxiliary lines created by the reference auxiliary line creation unit and the adjacent auxiliary line creation unit.

Accordingly, it is possible for the user to make the work vehicle autonomously travel in the headland area by performing a simple operation.

According to the third aspect of the present invention, an autonomous travel system having the following configuration is provided. That is, this autonomous travel system includes a farm field acquisition unit, an auxiliary line creation unit, a selection processing unit, and a travel control unit. The farm field acquisition unit obtains information of a farm field including a work area, in which a travel path for a work vehicle on which a work machine is mounted to autonomously travel to perform work is set, and a headland area, which is formed between the work area and a farm field peripheral edge. The auxiliary line creation unit creates an auxiliary line for causing the work vehicle to autonomously travel in the headland area. The selection processing unit performs a process of allowing a user to select in which of the work area and the headland area the work is to be performed and a process of allowing the user to select whether the work in the headland is to be performed or the work is to be ended. The travel control unit causes the work vehicle to autonomously travel along at least a part of the auxiliary line created by the auxiliary line creation unit in a case where it is determined that the user has selected the work in the headland area.

Accordingly, it is possible for the user to make the work vehicle autonomously travel in the headland area by performing a simple operation.

DESCRIPTION OF EMBODIMENTS

Next, an autonomous travel system of an embodiment of the present invention will be explained. The autonomous travel system is for causing one or more work vehicles to autonomously travel in a farm field (travel area) and to execute all or a part of the work. Although a tractor is taken as an example of the work vehicle in the explanation of the present embodiment, the work vehicle can also include a walking-type work machine as well as a riding-type work machine such as a rice transplanter, combine, civil engineering/construction work device, or snowplow, other than a tractor. In the present specification, autonomous traveling means that a control unit (ECU) included in a tractor controls the traveling-related configuration included in the tractor so that at least steering is autonomously performed along a predetermined path. Further, such a configuration in which the vehicle speed or work by the work machine is autonomously performed in addition to steering is also possible. Autonomous traveling includes a case in which a person is on board the tractor and a case in which no person is on board the tractor.

Figure 1:
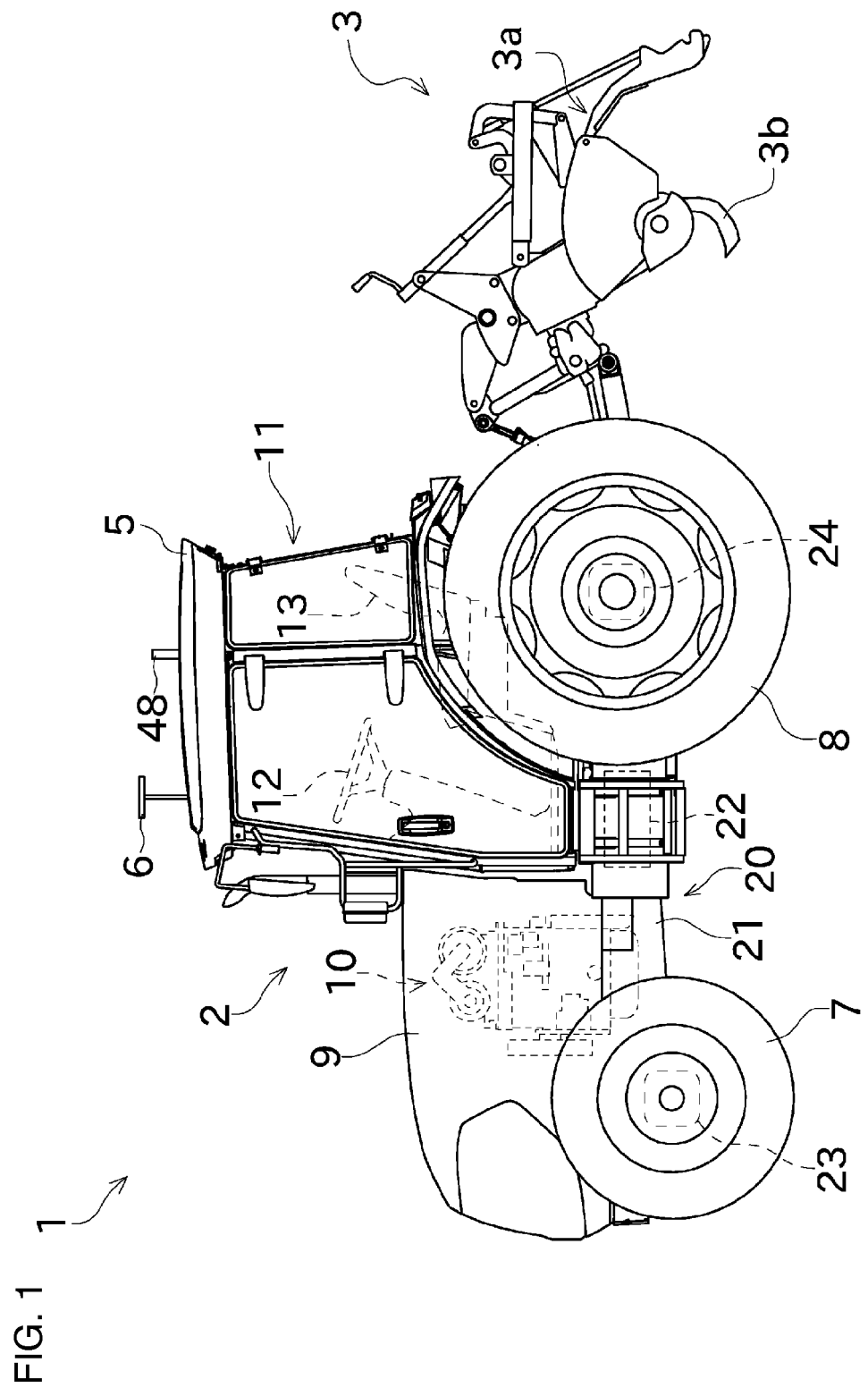
FIG. 1 is a side view illustrating an overall configuration of a tractor used in the autonomous travel system according to an embodiment of the present invention.
Figure 2:
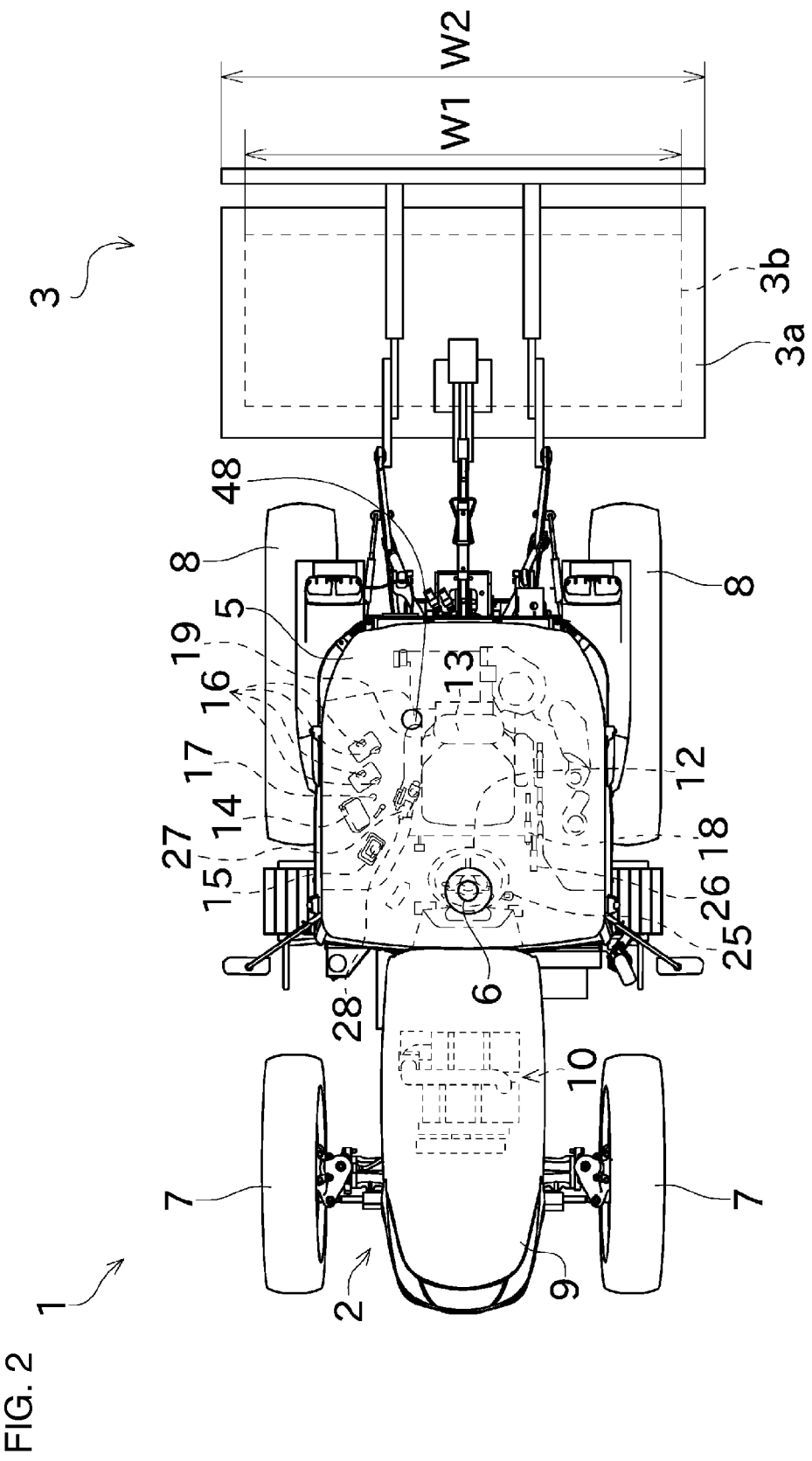
FIG. 2 is a plan view of the tractor.
Figure 3:
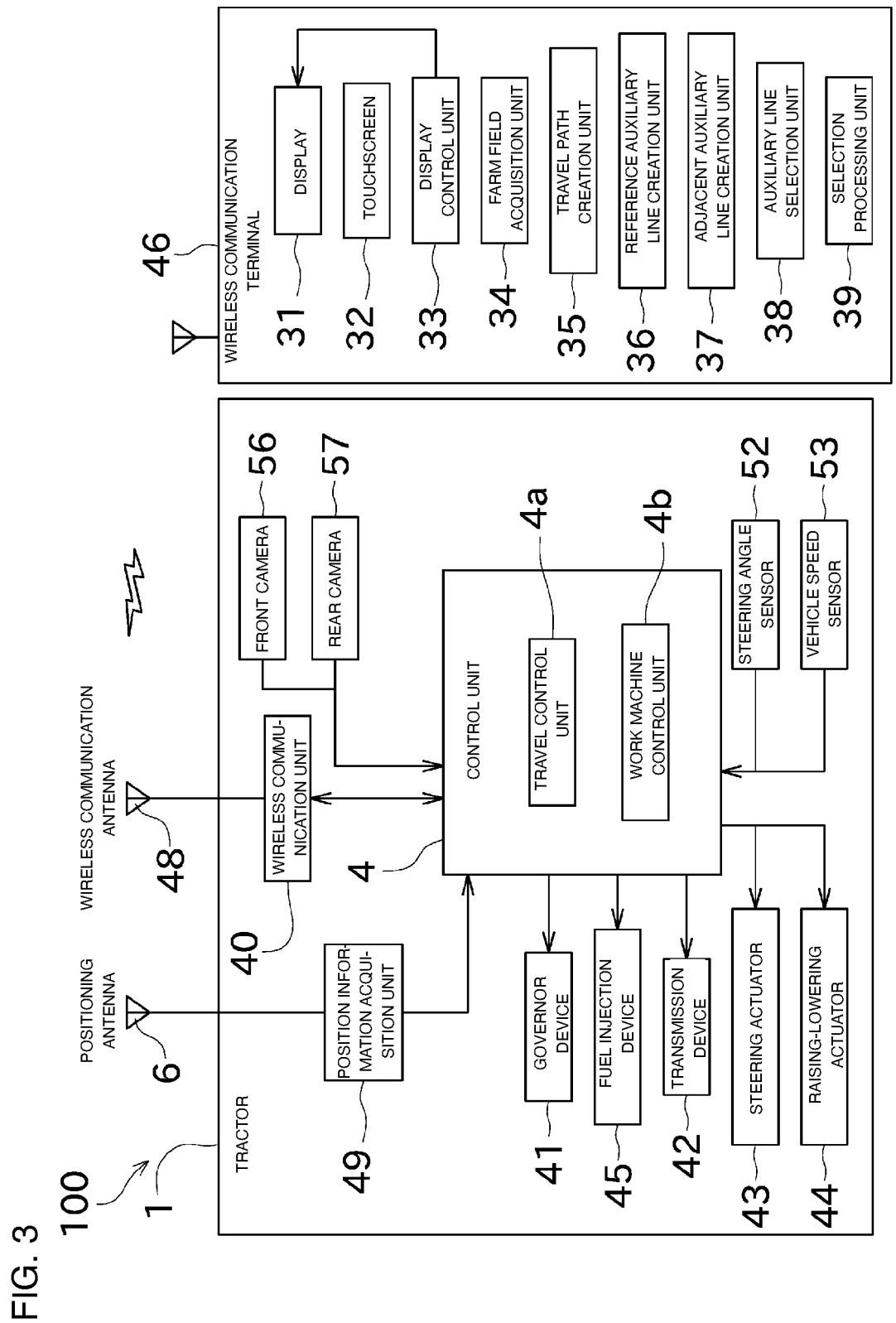
FIG. 3 is a block diagram illustrating a main configuration of the autonomous travel system.

Next, with reference to FIG. 1 through FIG. 3, a specific explanation is given of the autonomous travel system 100. FIG. 1 is a side view illustrating the overall configuration of the tractor 1. FIG. 2 is a plan view of the tractor 1. FIG. 3 is a block diagram illustrating a main configuration of the control system of the autonomous travel system 100.

The tractor 1 illustrated in FIG. 1 is used in the autonomous travel system 100 and is operated by performing wireless communication with the wireless communication terminal 46. The tractor 1 includes a travel machine body (vehicle body part) 2 capable of autonomously traveling in the farm field. For example, a work machine 3 for performing agricultural work is detachably attached to the travel machine body 2.

As this work machine 3, for example, there are various work machines such as a tiller, plow, fertilizer applicator, mower, and seeder, and the work machine 3 selected from these is mounted on the travel machine body 2. In FIG. 1 and FIG. 2, an example in which a tiller is attached as the work machine 3 is illustrated. The tiller includes the tillage claw 3b arranged inside the cover 3a, and this tillage claw 3b rotates around the vehicle width direction as the rotation center, in order to till the farm field. Here, the width (length in the vehicle width direction) in which the work machine 3 performs the work is referred to as the work width W1, and the length in the vehicle width direction of the work machine 3 is referred to as the work machine width W2. In the tiller having the shape illustrated in FIG. 2, the width of the tillage claw 3b corresponds to the work width W1, and the width of the cover 3a corresponds to the work machine width W2. Since the tiller includes the tillage claw 3b arranged inside the cover 3a, the work width W1 is narrower than the work machine width W2. However, for example, in a case where a fertilizer applicator that sprays chemicals so that the chemicals are spread in the width direction is attached as the work machine 3, the work width W1 may be wider than the work machine width W2. In this way, which of the work width W1 and the work machine width W2 is wider differs, depending on the work machine 3 and the contents of the work. Further, the travel machine body 2 is capable of changing the height and posture of the mounted work machine 3.

With reference to FIG. 1 and FIG. 2, more detailed explanation is given of the configuration of the tractor 1. As illustrated in FIG. 1, regarding the travel machine body 2 of the tractor 1, the front part thereof is supported by the left and right pair of front wheels (wheels) 7 and 7 and the rear part thereof is supported by the left and right pair of rear wheels 8 and 8.

The bonnet 9 is arranged at the front part of the travel machine body 2. The engine 10, which is the drive source of the tractor 1, and a fuel tank (illustration omitted) are housed in this bonnet 9. For example, this engine 10 can be configured with a diesel engine, but this engine 10 is not limited as such and may be configured with a gasoline engine, for example. In addition, as the drive source, an electric motor may be used in addition to or instead of the engine.

The cabin 11 for the user to board is arranged behind the bonnet 9. Inside this cabin 11, the steering handle (steering tool) 12 for the user to perform steering, the seat 13 that the user can sit on, and various operation tools for performing various kinds of operations are mainly provided. However, the work vehicle such as the tractor 1 may or may not be provided with a cabin 11.

As illustrated in FIG. 2, the above-described operation tools include, for example, the monitor device 14, the throttle lever 15, the main transmission lever 27, the multiple hydraulic operation levers 16, the PTO switch 17, the PTO transmission lever 18, the sub transmission lever 19, the forward-reverse traveling switching lever 25, the parking brake 26, the work machine raising-lowering switch 28, etc. These operation devices are arranged in the vicinity of the seat 13 or in the vicinity of the steering handle 12.

The monitor device 14 is capable of displaying various kinds of information of the tractor 1. The throttle lever 15 is an operation tool for setting the rotation speed of the engine 10. The main transmission lever 27 is an operation tool for steplessly changing the traveling speed of the tractor 1. The hydraulic operation lever 16 is an operation tool for an operation of switching an illustration-omitted external hydraulic pressure take-out valve. The PTO switch 17 is an operation tool for switching between transmission and cut-off of power to an illustration-omitted PTO shaft (power take-off shaft), which protrudes from the rear end of the transmission 22. That is, when the PTO switch 17 is in the ON state, power is transmitted to the PTO shaft so that the PTO shaft rotates and the work machine 3 is driven whereas, when the PTO switch 17 is in the OFF state, the power to the PTO shaft is cut off so that the PTO shaft does not rotate and the work machine 3 is stopped. The PTO transmission lever 18 is for an operation of changing the power to be input to the work machine 3 and, specifically, is an operation tool for performing a transmission operation for the rotation speed of the PTO shaft. The sub transmission lever 19 is an operation tool for switching the gear ratio of a traveling sub transmission gear mechanism in the transmission 22. The forward-reverse traveling switching lever 25 is switchable among a forward-traveling position, a neutral position, and a reverse-traveling position. In a case where the forward-reverse traveling switching lever 25 is positioned in the forward-traveling position, the power of the engine 10 is transmitted to the rear wheels 8 so that the tractor 1 travels forward. In a case where the forward-reverse traveling switching lever 25 is positioned in the neutral position, the tractor 1 does not travel forward or backward. In a case where the forward-reverse traveling switching lever 25 is positioned in the reverse-traveling position, the power of the engine 10 is transmitted to the rear wheels 8 so that the tractor 1 travels backward. The parking brake (braking operation tool) 26 is an operation tool that is manually operated by the user to generate a braking force and, for example, is used in a case of stopping the tractor 1 for a while. The work machine raising-lowering switch 28 is an operation tool for an operation of raising and lowering the height of the work machine 3 mounted on the travel machine body 2 within a predetermined range.

As illustrated in FIG. 1, the chassis 20 of the tractor 1 is disposed at the lower part of the travel machine body 2. The chassis 20 is configured with the machine body frame 21, the transmission 22, the front axle 23, the rear axle 24, etc.

The machine body frame 21 is a support member at the front part of the tractor 1 and supports the engine 10 directly or via an anti-vibration member or the like. The transmission 22 transforms the power from the engine 10 and transmits the power to the front axle 23 and the rear axle 24. The front axle 23 transmits the power that is input from the transmission 22 to the front wheels 7. The rear axle 24 transmits the power that is input from the transmission 22 to the rear wheels 8.

As illustrated in FIG. 3, the tractor 1 includes the control unit 4. The control unit 4 is configured as an ordinary computer and includes an illustration-omitted arithmetic device such as a CPU, a storage device such as a non-volatile memory, an input-output unit, etc. The storage device stores various kinds of programs, data related to the control of the tractor 1, etc. The arithmetic device is capable of reading various kinds of programs from the storage device and executing the programs. By the cooperation of the above-described hardware and software, the control unit 4 can be operated as a travel control unit 4a and a work machine control unit 4b. The travel control unit 4a controls the traveling (forward traveling, reverse traveling, stopping, turning, etc.) of the travel machine body 2. The work machine control unit 4b controls the operation (raising/lowering, driving, stopping, etc.) of the work machine 3. Note that the control unit 4 can also perform controls other than the above (for example, analysis of captured images, etc.). Further, the control unit 4 can be configured with one computer or configured with multiple computers.

The travel control unit 4a performs vehicle speed control for controlling the vehicle speed of the tractor 1 and steering control for steering the tractor 1. In a case of controlling the vehicle speed, the control unit 4 controls at least one of the rotation speed of the engine 10 and the gear ratio of the transmission 22.

Specifically, the engine 10 is provided with a governor device 41 including an illustration-omitted actuator for changing the rotation speed of the engine 10. The travel control unit 4a is capable of controlling the rotation speed of the engine 10 by controlling the governor device 41. Further, the fuel injection device 45 for adjusting the injection timing and injection amount of fuel to be injected (supplied) into the combustion chamber of the engine 10 is installed in the engine 10. By controlling the fuel injection device 45, the travel control unit 4a is capable of stopping the supply of fuel to the engine 10 and stopping the driving of the engine 10, for example.

Further, the transmission 22 is provided with the transmission device 42, which is a hydraulic continuously-variable transmission device with a movable swash plate, for example. The travel control unit 4a changes the gear ratio of the transmission 22 by changing the angle of the swash plate of the transmission device 42 by use of an illustration-omitted actuator. By performing the above processing, the tractor 1 is changed to a target vehicle speed.

In a case of performing the steering control, the travel control unit 4a controls the rotation angle of the steering handle 12. Specifically, the steering actuator 43 is disposed in the middle part of the rotation shaft (steering shaft) of the steering handle 12. With this configuration, in a case where the tractor 1 travels on a predetermined path, the control unit 4 calculates an appropriate rotation angle of the steering handle 12 so that the tractor 1 travels along the path and controls the rotation angle of the steering handle 12 to the obtained rotation angle by driving the steering actuator 43.

The work machine control unit 4b switches between driving and stopping of the work machine 3 by controlling the PTO switch 17, based on whether or not a work execution condition is satisfied. Further, the work machine control unit 4b controls raising and lowering of the work machine 3. Specifically, the tractor 1 is provided with the raising-lowering actuator 44, which is configured with a hydraulic cylinder, etc., in the vicinity of a three-point link mechanism that connects the work machine 3 to the travel machine body 2. The work machine control unit 4b drives the raising-lowering actuator 44 to cause the work machine 3 to perform a raising-lowering operation as appropriate, so that it is possible to perform the work with the work machine 3 at a desired height.

The tractor 1 provided with the control unit 4 as described above controls each part of the tractor 1 (the travel machine body 2, the work machine 3, etc.) by the control unit 4 without a user boarding the cabin 11 and performing various operations, so that the tractor 1 can autonomously perform work while autonomously traveling in the farm field.

Next, an explanation is given of a configuration for acquiring information necessary for autonomous traveling. Specifically, as illustrated in FIG. 3, etc., the tractor 1 of the present embodiment includes the positioning antenna 6, the wireless communication antenna 48, the front camera 56, the rear camera 57, the vehicle speed sensor 53, the steering angle sensor 52, etc. Further, in addition to the above, the tractor 1 includes an inertial measurement unit (IMU) capable of specifying the posture (roll angle, pitch angle, yaw angle) of the travel machine body 2.

The positioning antenna 6 receives a signal from a positioning satellite that configures a positioning system such as a satellite positioning system (GNSS). As illustrated in FIG. 1, the positioning antenna 6 is attached to the upper surface of the roof 5 of the cabin 11 of the tractor 1. The positioning signal received by the positioning antenna 6 is input to the position information acquisition unit 49 illustrated in FIG. 3, which is a position detection unit. The position information acquisition unit 49 calculates and acquires the position information of the travel machine body 2 of the tractor 1 (strictly speaking, the positioning antenna 6) as latitude/longitude information, for example. The position information acquired by the position information acquisition unit 49 is input to the control unit 4 and utilized for autonomous traveling.

Note that, although a high-precision satellite positioning system utilizing the GNSS-RTK method is used in the present embodiment, the present embodiment is not limited as such, and it is also possible to use other positioning systems as long as high-precision position coordinates can be obtained. For example, a relative positioning system (DGPS) or a geosynchronous satellite navigation augmentation system (SBAS) may be used.

The wireless communication antenna 48 is for receiving a signal from the wireless communication terminal 46 operated by the user and for transmitting a signal to the wireless communication terminal 46. As illustrated in FIG. 1, the wireless communication antenna 48 is attached to the upper surface of the roof 5 provided on the cabin 11 of the tractor 1. The signal from the wireless communication terminal 46 received by the wireless communication antenna 48 is signal-processed by the wireless communication unit 40 illustrated in FIG. 3 and then input to the control unit 4. Further, the signal transmitted from the control unit 4, etc., to the wireless communication terminal 46 is signal-processed by the wireless communication unit 40 and then transmitted from the wireless communication antenna 48 to be received by the wireless communication terminal 46.

The front camera 56 is for capturing an image in the front of the tractor 1. The rear camera 57 is for capturing an image in the rear of the tractor 1. The front camera 56 and the rear camera 57 are attached to the roof 5 of the tractor 1. Video data captured by the front camera 56 and the rear camera 57 is transmitted from the wireless communication antenna 48 to the wireless communication terminal 46 by the wireless communication unit 40. The wireless communication terminal 46 that has received the video data displays the contents on the display 31.

The above-described vehicle speed sensor 53 is for detecting the vehicle speed of the tractor 1 and is provided on an axle between the front wheels 7 and 7, for example. The data of a detection result obtained by the vehicle speed sensor 53 is output to the control unit 4. Note that it is also possible that the vehicle speed of the tractor 1 is not detected by the vehicle speed sensor 53 but is calculated based on the moving time period of the tractor 1 in a predetermined distance based on the positioning antenna 6. The steering angle sensor 52 is a sensor that detects the steering angle of the front wheels 7 and 7. In the present embodiment, the steering angle sensor 52 is provided on an illustration-omitted kingpin provided on the front wheels 7 and 7. The data of a detection result obtained by the steering angle sensor 52 is output to the control unit 4. Note that a configuration in which the steering angle sensor 52 is provided on the steering shaft is also possible.

As illustrated in FIG. 3, the wireless communication terminal 46 includes the display 31 and the touchscreen 32. The wireless communication terminal 46 is a tablet terminal but can be a smartphone, a laptop PC, or the like. Note that, in a case of making the tractor 1 autonomously travel in a state where the user is on board the tractor 1, it is also possible that the same function as the wireless communication terminal 46 is provided on the tractor 1 side (for example, the control unit 4). The user can refer to and check the information displayed on the display 31 of the wireless communication terminal 46 (for example, information from the front camera 56, the rear camera 57, the vehicle speed sensor 53, etc.). In addition, the user can operate the above-described touchscreen 32, an illustration-omitted hardware key, or the like, so as to transmit a control signal (for example, a pause signal, etc.) for controlling the tractor 1 to the control unit 4 of the tractor 1.

The wireless communication terminal 46 includes an illustration-omitted arithmetic device such as a CPU, a storage device such as a non-volatile memory, an input-output unit, etc. The storage device stores various kinds of programs, data related to travel paths, etc. The arithmetic device is capable of reading various kinds of programs from the storage device and executing the programs. By the cooperation of the above-described hardware and software, the wireless communication terminal 46 can be operated as the display control unit 33, the farm field acquisition unit 34, the travel path creation unit 35, the reference auxiliary line creation unit (auxiliary line creation unit) 36, the adjacent auxiliary line creation unit (auxiliary line creation unit) 37, the auxiliary line selection unit 38, and the selection processing unit 39 (specific processing will be described later).

The display control unit 33 creates display data to be displayed on the display 31 and controls the display contents as appropriate. For example, the display control unit 33 displays a predetermined monitoring screen, instruction screen, or the like on the display 31 while the tractor 1 is caused to autonomously travel along a travel path.

The farm field acquisition unit 34 acquires the position and shape of a target farm field in which the tractor 1 performs autonomous traveling from the storage device. The position and shape of the farm field are created based on the transition of the position information of the positioning antenna 6 when the tractor 1 is caused to travel along the periphery of the farm field. Note that it is also possible that, without causing the tractor 1 to actually travel, the user designates a range on a map displayed on the display 31 so that the position and shape of the farm field are created, for example. Further, although the information related to the farm field is stored in the wireless communication terminal 46 in the present embodiment, it is also possible that the information related to the farm field is stored in a server that is physically distant from the wireless communication terminal 46. In this case, the farm field acquisition unit 34 acquires information related to the farm field from this server.

Figure 4:
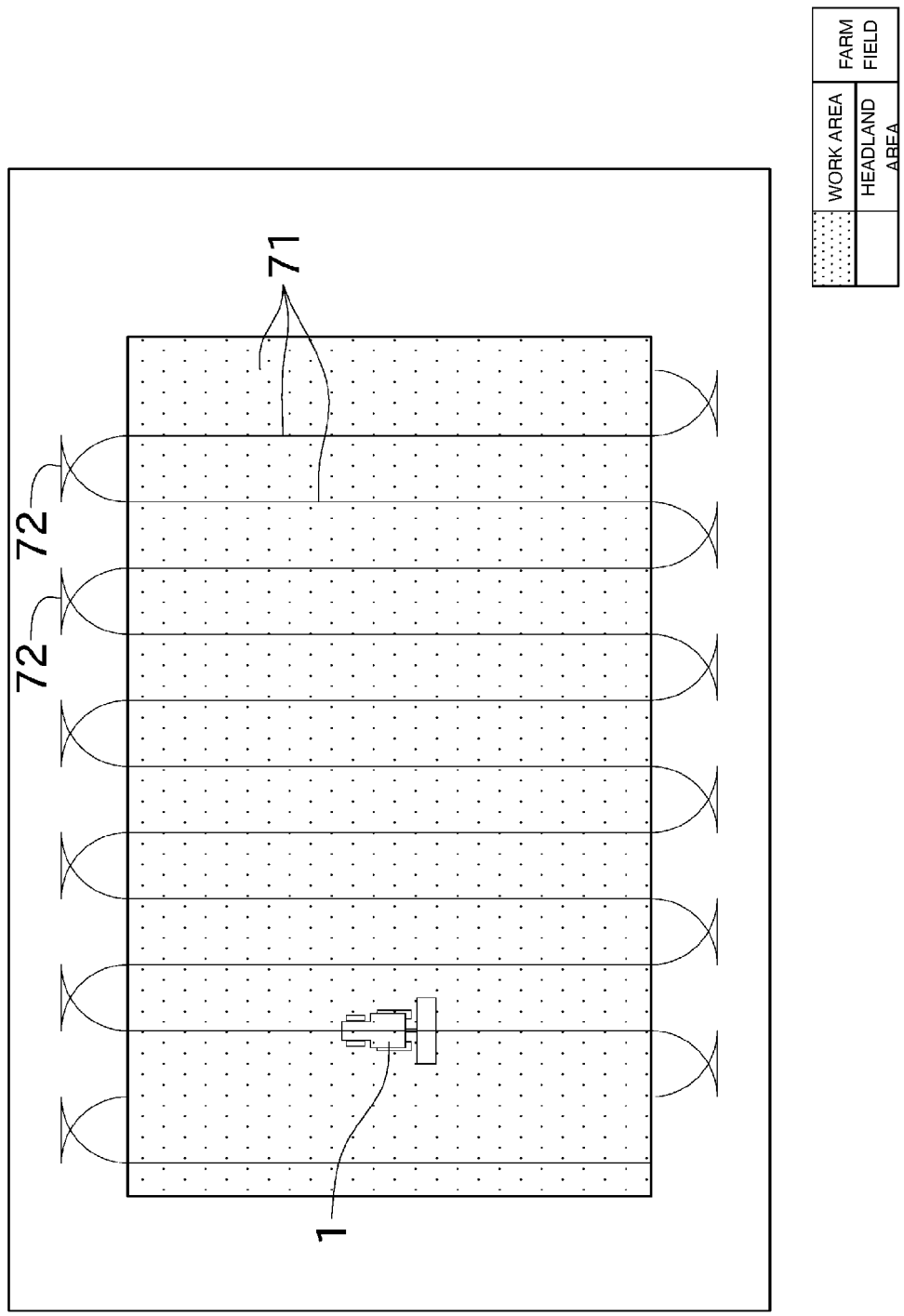
FIG. 4 is a diagram illustrating a travel path on which the tractor is caused to autonomously travel for performing work in a work area of a farm field.

Here, with reference to FIG. 4, a brief explanation is given of the farm field. The farm field includes a work area and a headland area. The work area is located in the central part of the farm field and is an area for performing work (the area of which the main purpose is to perform work). The headland area is located outside the work area and is an area to be used for properly performing work in the work area. For example, the headland area is used for moving the tractor 1 that has entered the farm field to the start position of work in the work area. In addition, the headland area is also used for turning the tractor 1 that has travelled straight in the work area. Further, in the present embodiment, the work is performed not only on the work area but also on the headland area. Specifically, the tractor 1 travels in the work area to perform the work, and then the tractor 1 travels in the headland area to perform the work.

The travel path creation unit 35 creates a travel path for performing the work in the work area. In the present embodiment, the travel path creation unit 35 creates the straight paths 71 and the turning paths 72 illustrated in FIG. 4, based on various kinds of settings made by the user using the wireless communication terminal 46. The straight paths 71 are parallel to one side (short side) of the farm field peripheral edge and the work area peripheral edge. The arrangement interval of the straight paths 71 corresponds to the value obtained by subtracting the overlap amount (the length indicating how much adjacent work ranges overlap in the vehicle width direction) from the work width W1 or the value obtained by adding the work interval (the length indicating how much interval is provided between adjacent work ranges in the vehicle width direction) to the work width W1. Further, a turning path 72 is a path connecting straight paths 71 to each other. Although a turning path 72 connects adjacent straight paths 71 to each other in the present embodiment, it is also possible that a turning path 72 connects distant straight paths 71 to each other. Further, a turning path 72 of the present embodiment is a path on which the tractor 1 is caused to turn around by making a turn by 90 degrees, then traveling backward, then switching to forward traveling, and then turning again by 90 degrees, so that the tractor 1 reaches the next straight path 71. However, instead of this type of turning path 72, it is also possible to create a turning path on which the tractor 1 is caused to turn around by making a turn by 180 degrees, so that the tractor 1 reaches the next straight path 71. The travel paths created in this way are stored in the wireless communication terminal 46.

The user appropriately operates the wireless communication terminal 46 to input (transfer) the information of the travel paths created by the travel path creation unit 35 to the control unit 4 of the tractor 1. Thereafter, the user makes the tractor 1 travel and locates the tractor 1 at the start position of the travel paths. Subsequently, the user operates the wireless communication terminal 46 to provide an instruction for starting autonomous traveling. Accordingly, the tractor 1 performs work while traveling along the straight paths 71 and the turning paths 72.

The reference auxiliary line creation unit 36 and the adjacent auxiliary line creation unit 37 perform a process of creating auxiliary lines to be used for autonomous traveling in the headland area. When the user performs a predetermined operation on the wireless communication terminal 46, the tractor 1 autonomously travels along an auxiliary line. Note that, in the configuration of the present embodiment, turning, switching between driving and stopping of the work machine 3, etc., in the headland area are performed based on an operation by the user and are not autonomously performed by the tractor 1. Further, such a configuration in which the tractor 1 autonomously performs these processes is also possible. Note that the processing performed by the auxiliary line selection unit 38 and the selection processing unit 39 will be described later.

Hereinafter, the auxiliary lines created by the reference auxiliary line creation unit 36 and the adjacent auxiliary line creation unit 37 will be explained in detail. The reference auxiliary line creation unit 36 and the adjacent auxiliary line creation unit 37 are capable of creating two types of auxiliary lines according to instructions from the user, etc. The first auxiliary lines are auxiliary lines to be used in a case where such work in which it is required to eliminate remaining work (for example, tillage) is performed in the headland area. The second auxiliary lines are auxiliary lines to be used in a case where such work in which the work pitch is desired to be constant even though remaining work occurs (seeding, ridging, etc.) is performed in the headland area.

Figure 5:
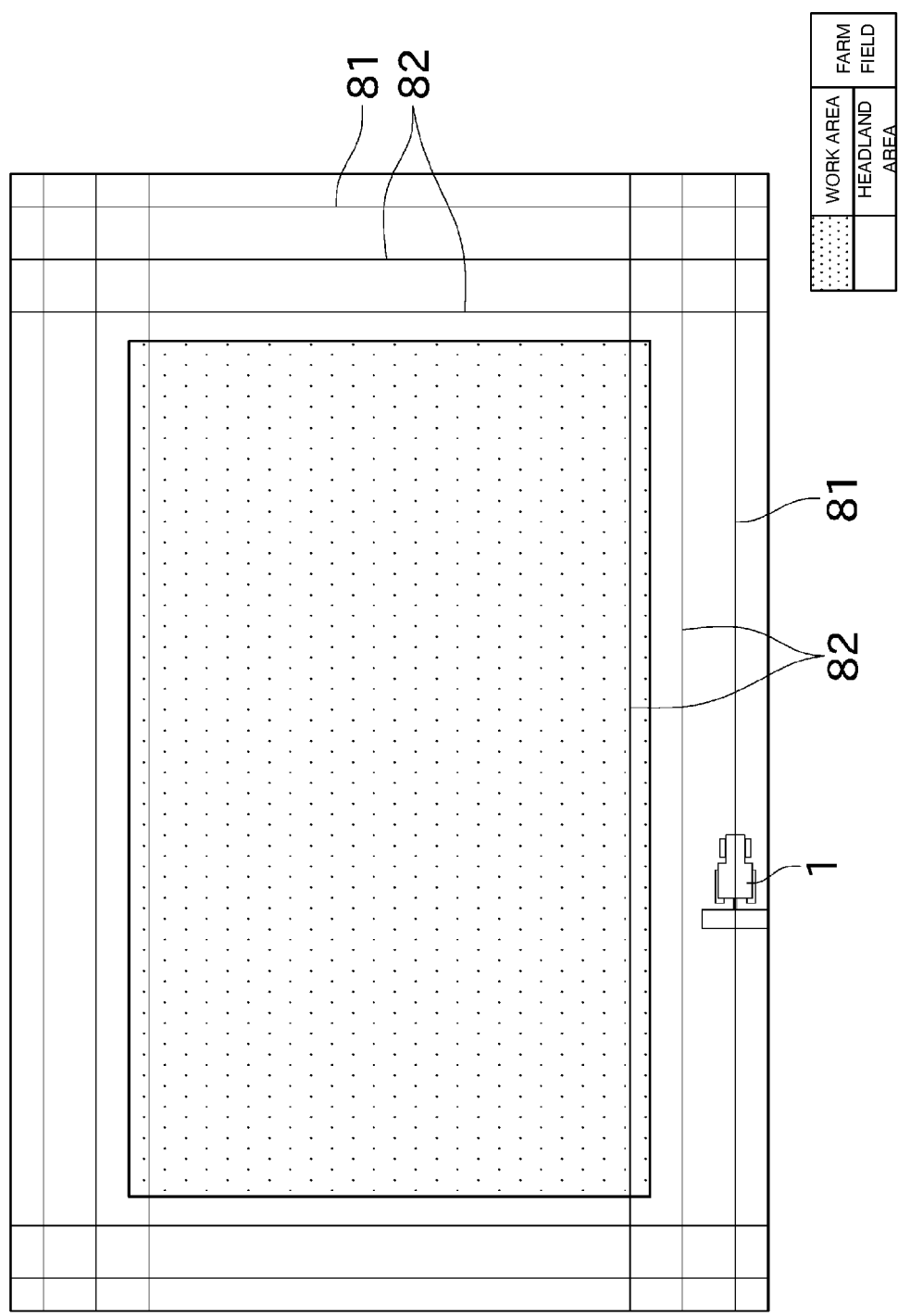
FIG. 5 is a diagram illustrating a first reference auxiliary line and first adjacent auxiliary lines created in a headland area.
Figure 6:
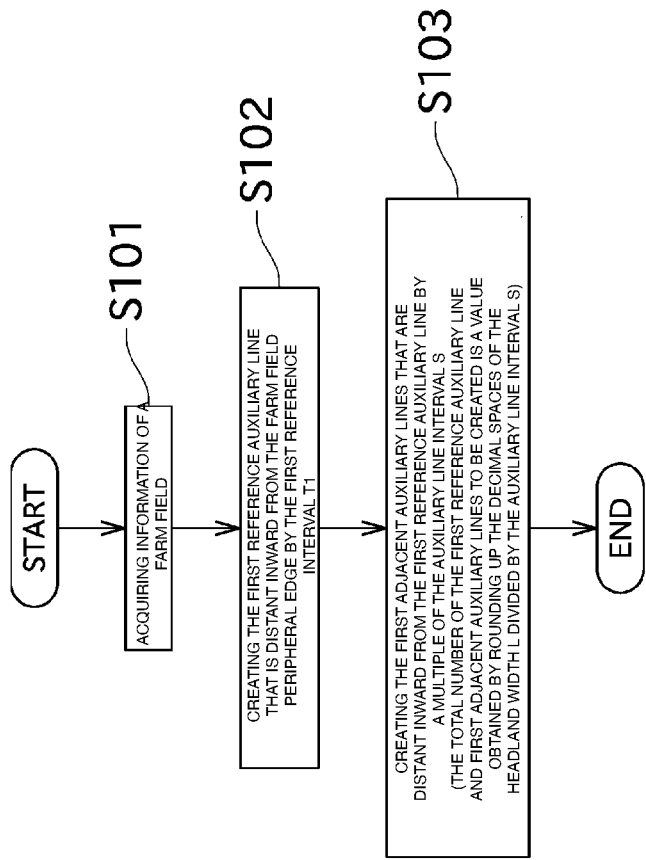
FIG. 6 is a flowchart illustrating the processing for creating the first reference auxiliary line and first adjacent auxiliary lines.
Figure 7:
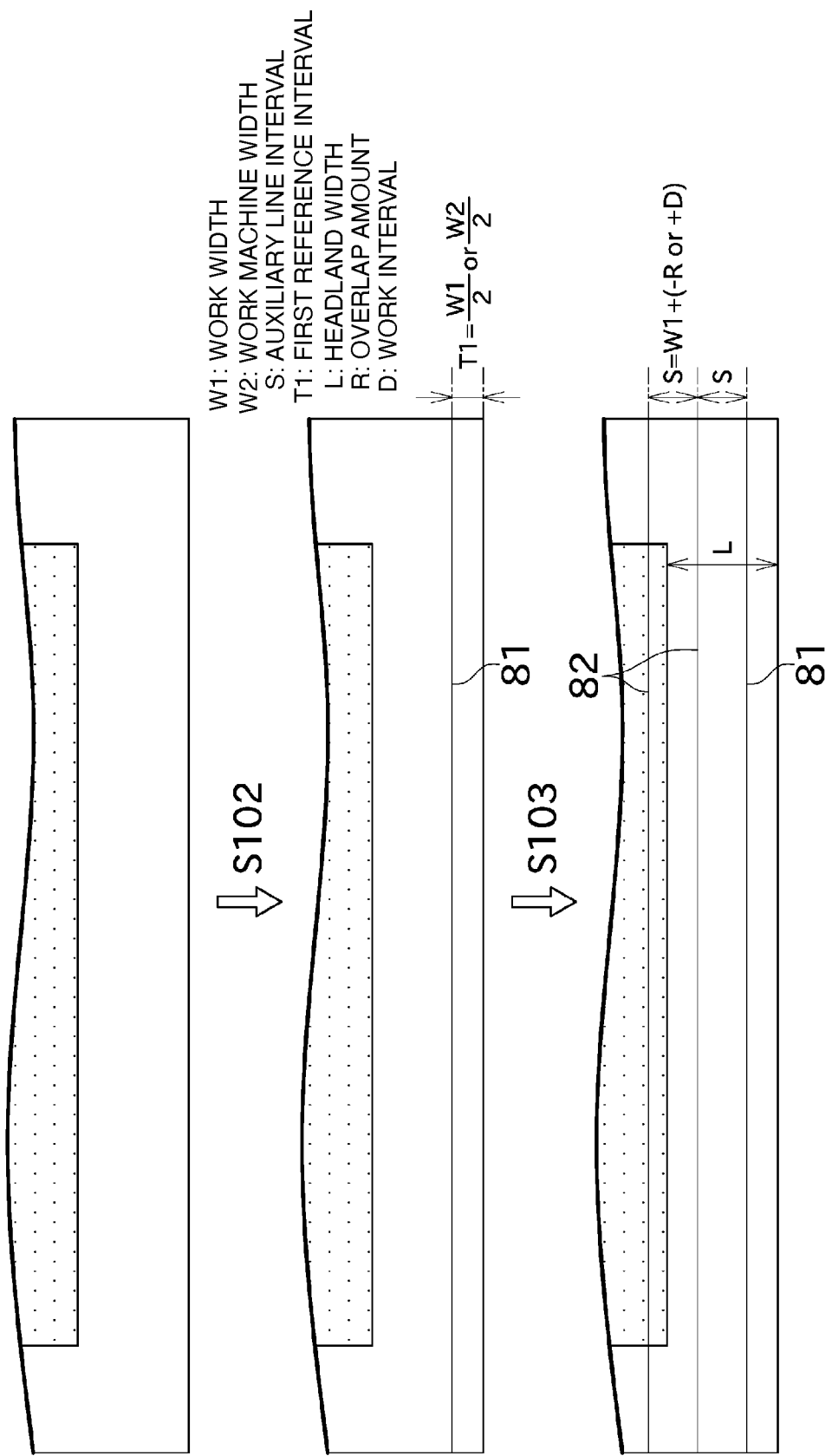
FIG. 7 is a diagram schematically illustrating a flow of the processing for creating the first reference auxiliary line and first adjacent auxiliary lines.

First, with reference to FIG. 5 through FIG. 7, an explanation is given of the method for creating the first auxiliary lines. As illustrated in FIG. 5, the first auxiliary lines include a first reference auxiliary line 81 and a first adjacent auxiliary line 82.

First, the farm field acquisition unit 34 acquires information of the farm field for which the first auxiliary lines are created (S101). The information acquired here includes, for example, the positions of the peripheral edges (outlines) of the farm field, the work area, and the headland area.

Next, the reference auxiliary line creation unit 36 creates the first reference auxiliary line 81, which is distant (offset) inward from the farm field peripheral edge (each side configuring the peripheral outline of the farm field) by the first reference interval T1 (S102). Therefore, the first reference auxiliary line 81 is parallel to the farm field peripheral edge (basically parallel to the work area peripheral edge as well). Further, since the first reference auxiliary line 81 is created for each side of the farm field peripheral edge, four first reference auxiliary lines 81 are created in a case where the farm field is a quadrangle. Further, as illustrated in FIG. 7, the first reference interval T1 is ½ of the work width W1 or ½ of the work machine width W2. Note that it is preferable that the first reference interval T1 is ½ of the wider one of the work width W1 and the work machine width W2. Accordingly, in a case where the tractor 1 travels along the first reference auxiliary line 81, it is possible to prevent the work from being performed outside the farm field and to prevent the work machine from getting out of the farm field.

Next, the adjacent auxiliary line creation unit 37 creates a first adjacent auxiliary line 82, which is distant (offset) inward from the first reference auxiliary line 81 by the auxiliary line interval S (S103). Therefore, the first adjacent auxiliary line 82 is parallel to the first reference auxiliary line 81. Further, as illustrated in FIG. 7, the auxiliary line interval S corresponds to the value obtained by subtracting the overlap amount R from the work width W1 or the value obtained by adding the work interval D to the work width W1. Note that, although the overlap amount R and the work interval D correspond to the same values as those used when creating the straight paths 71, it is also possible to use different values. Further, the auxiliary line interval S and the work width W1 may have the same value (in other words, the overlap amount R or the work interval D may be zero).

The adjacent auxiliary line creation unit 37 creates zero, one, or multiple first adjacent auxiliary lines 82. The specific creating number is as follows. That is, the number of first auxiliary lines to be created for one side of the farm field peripheral edge (that is, the total number of first reference auxiliary lines 81 and first adjacent auxiliary lines 82 to be created) corresponds to the value obtained by rounding up the decimal places of the headland width L divided by the auxiliary line interval S. The headland width L is the distance from the farm field peripheral edge to the work area. By rounding up the decimal places, the work can be performed for the entire headland area (except for the work interval D for the work width W1). Depending on the conditions, the first adjacent auxiliary line 82 may be created on the work area (even in this case, the present path is for performing the work in the headland area). Further, in a case where the headland widths L are different depending on the sides of the farm field peripheral edge, the number of first auxiliary lines to be created may differ depending on the side.

Further, although the edge points of the first reference auxiliary lines 81 and the first adjacent auxiliary lines 82 are aligned with the farm field peripheral edge in the present embodiment, it is also possible that these edge points are set at positions different from the farm field peripheral edge (for example, distant positions). That is, since turning of the tractor 1 is started at the discretion of the user, there is no problem even though the first reference auxiliary lines 81 and the first adjacent auxiliary lines 82 are long.

Figure 8:
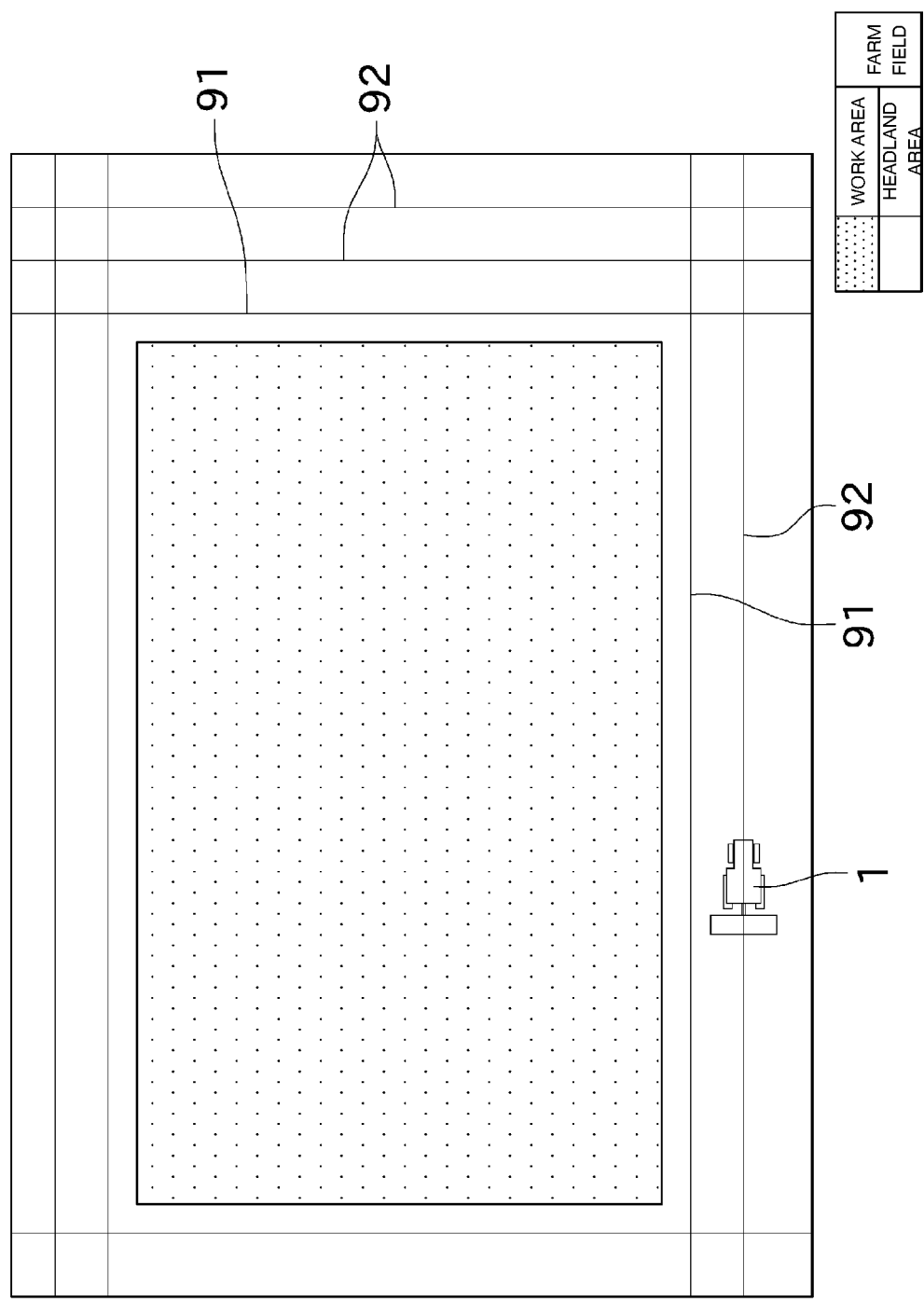
FIG. 8 is a diagram illustrating a second reference auxiliary line and second adjacent auxiliary lines created in the headland area.
Figure 9:
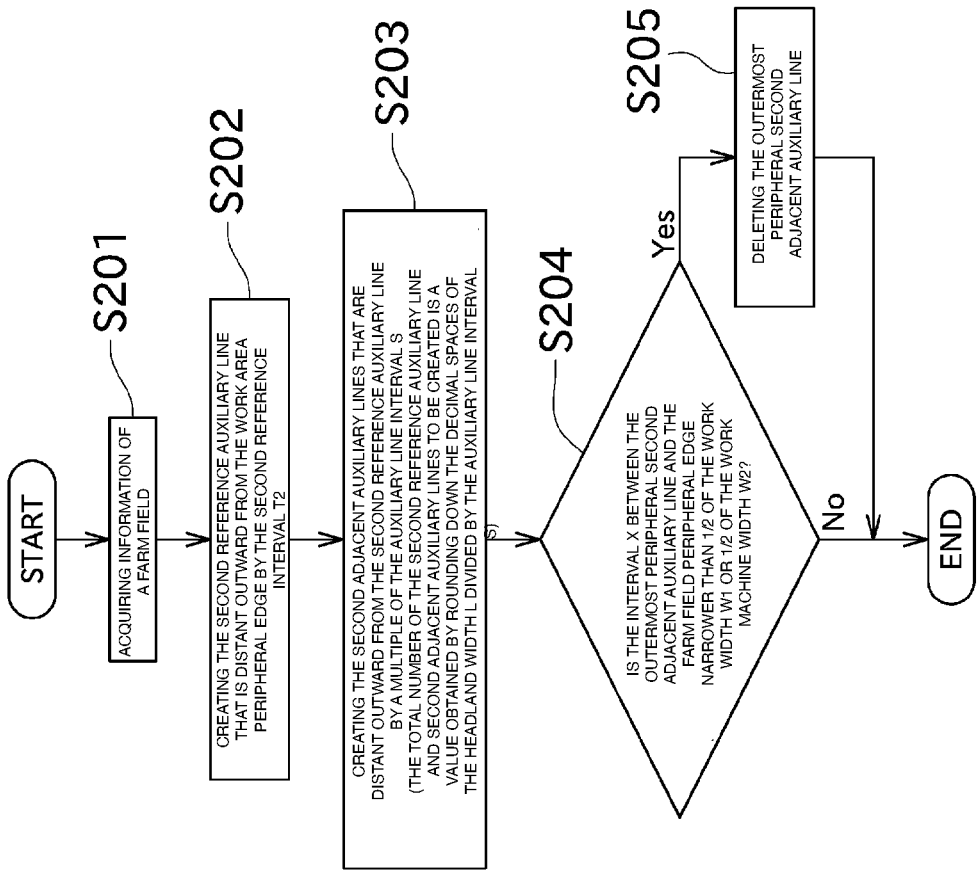
FIG. 9 is a flowchart illustrating the processing for creating the second reference auxiliary line and second adjacent auxiliary lines.
Figure 10:
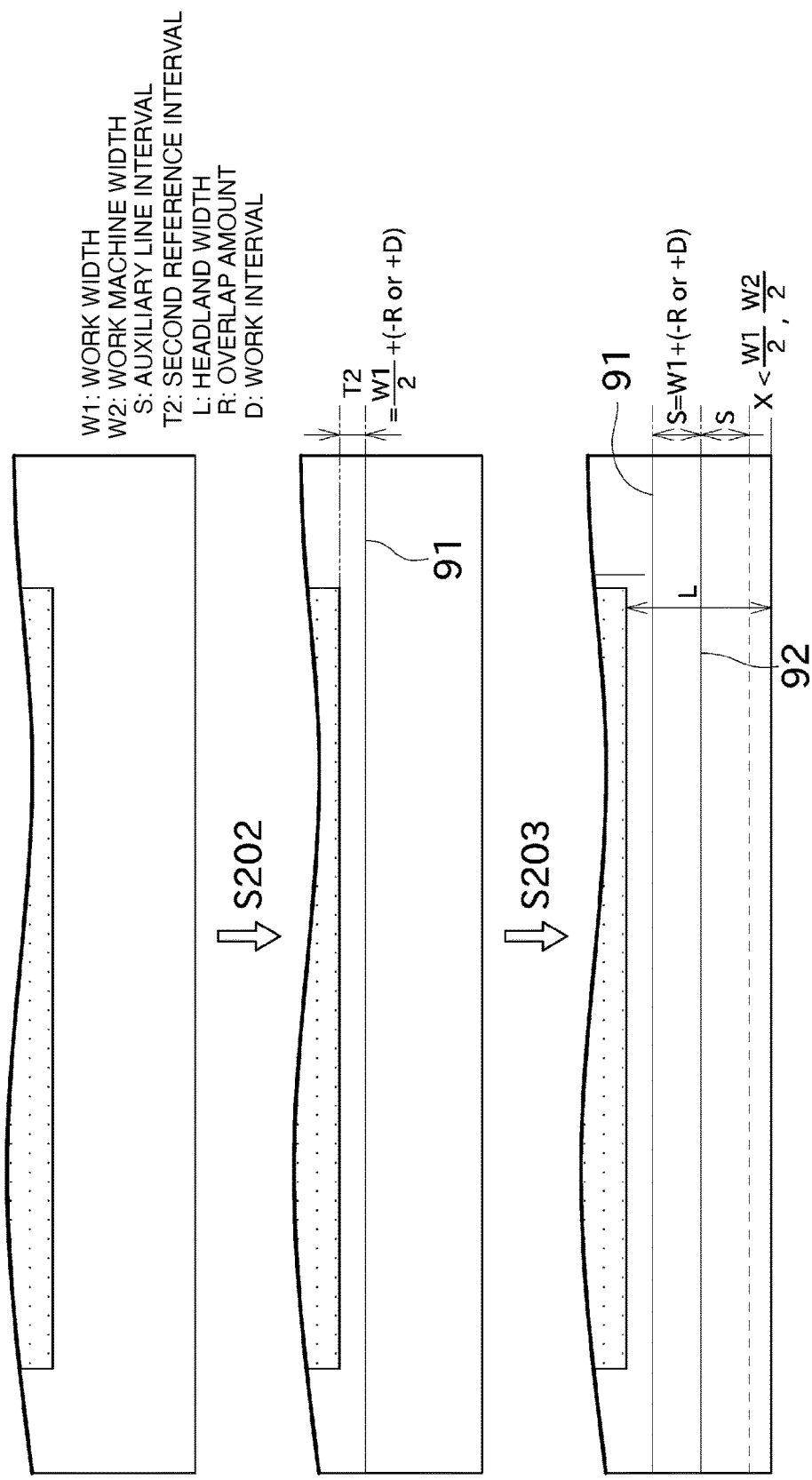
FIG. 10 is a diagram schematically illustrating a flow of the processing for creating the second reference auxiliary line and second adjacent auxiliary lines.

Next, with reference to FIG. 8 through FIG. 10, an explanation is given of the method for creating the second auxiliary lines. In the following explanation, the explanations for the parts common to the method for creating the first auxiliary lines may be simplified or omitted. As illustrated in FIG. 8, the second auxiliary lines include a second reference auxiliary line 91 and a second adjacent auxiliary line 92.

First, the farm field acquisition unit 34 acquires information of the farm field for which the second auxiliary lines are created (S201).

Next, the reference auxiliary line creation unit 36 creates the second reference auxiliary line 91, which is distant (offset) outward from the work area peripheral edge by the second reference interval T2 (S202). Therefore, the second reference auxiliary line 91 is parallel to the work area peripheral edge (basically parallel to the farm field peripheral edge as well). Further, the second reference auxiliary line 91 is created for each side of the work area peripheral edge. Further, as illustrated in FIG. 10, the second reference interval T2 corresponds to the value obtained by subtracting the overlap amount R from ½ of the work width W1 or the value obtained by adding the work interval D to ½ of the work width W1. Accordingly, the work can be started from an appropriate position outside the work area. Therefore, even if the work is performed while traveling in the headland area, the work will be performed only in the headland area and basically will not protrude into the work area.

Next, the adjacent auxiliary line creation unit 37 creates a second adjacent auxiliary line 92, which is distant (offset) outward from the second reference auxiliary line 91 by the auxiliary line interval S (S203). Therefore, the second adjacent auxiliary line 92 is parallel to the second reference auxiliary line 91.

The adjacent auxiliary line creation unit 37 creates zero, one, or multiple second adjacent auxiliary lines 92. The specific creating number is as follows. That is, the number of second auxiliary lines to be created for one side of the farm field peripheral edge (that is, the total number of second reference auxiliary lines 91 and second adjacent auxiliary lines 92 to be created) corresponds to the value obtained by rounding down the decimal places of the headland width L divided by the auxiliary line interval S. By rounding down the decimal places, it is possible to keep a constant work pitch while preventing the work from being performed outside the farm field although there is a possibility that a remaining work occurs. Further, in a case where the headland widths L are different depending on the sides of the farm field peripheral edge, the number of second auxiliary lines to be created may differ depending on the side. Further, the length of the second auxiliary lines can be changed as appropriate as in the case of the first auxiliary lines.

Next, the adjacent auxiliary line creation unit 37 determines whether or not the interval X between the outermost peripheral second adjacent auxiliary line 92 and the farm field peripheral edge is narrower than ½ of the work width W1 or ½ of the work machine width W2 (S204). Here, in a case where the interval X is narrower than ½ of the work width W1, there is a possibility that the work will be performed outside the farm field and, in a case where the interval X is narrower than ½ of the work machine width W2, there is a possibility that the work machine 3 will get outside the farm field. Therefore, in a case of Yes in Step S204, the adjacent auxiliary line creation unit 37 deletes the outermost peripheral second adjacent auxiliary line 92 (S205). Further, it is preferable to set the condition that the interval X is narrower than both, not either one, of ½ of the work width W1 and ½ of the work machine width W2. Note that, in a case of No in Step S204, the outermost peripheral second adjacent auxiliary line 92 will not be deleted.

Therefore, the number of second auxiliary lines to be finally created corresponds to "the value obtained by rounding down the decimal places of the headland width L divided by the auxiliary line interval S or the value obtained by subtracting 1 from that value". Further, in the configuration of the present embodiment, after the second adjacent auxiliary lines 92 are created under the condition of Step S203, whether or not it is necessary to delete the outermost peripheral second adjacent auxiliary line 92 is determined in Step S204. Alternatively, such a configuration in which the second adjacent auxiliary line 92 that satisfies the deletion condition of Step S204 is not created in the first place is also possible (in other words, it is also possible that a process similar to Steps S204 and S205 is incorporated in Step S203).

Next, a brief explanation is given of parallel movement of auxiliary lines. The first auxiliary lines are created with reference to the farm field peripheral edge. Therefore, for example, in a case where the position of the farm field peripheral edge is changed, the first auxiliary lines move in parallel accordingly. Further, since the first auxiliary lines correspond to each side of the farm field peripheral edge, for example, in a case where the position of one side of the farm field peripheral edge is changed, the positions of the first auxiliary lines corresponding to that side will be changed. Note that, for example, in a case where the headland width L is also changed, the processing of FIG. 6 will be performed again so that the first reference auxiliary lines 81 and the first adjacent auxiliary lines 82 will be created again.

Further, since the second auxiliary lines are different only in that the reference line is the work area peripheral edge, not the farm field peripheral edge, in a case where the position of the work area peripheral edge is changed, the same processing as with the first auxiliary lines will be performed.

Figure 11:
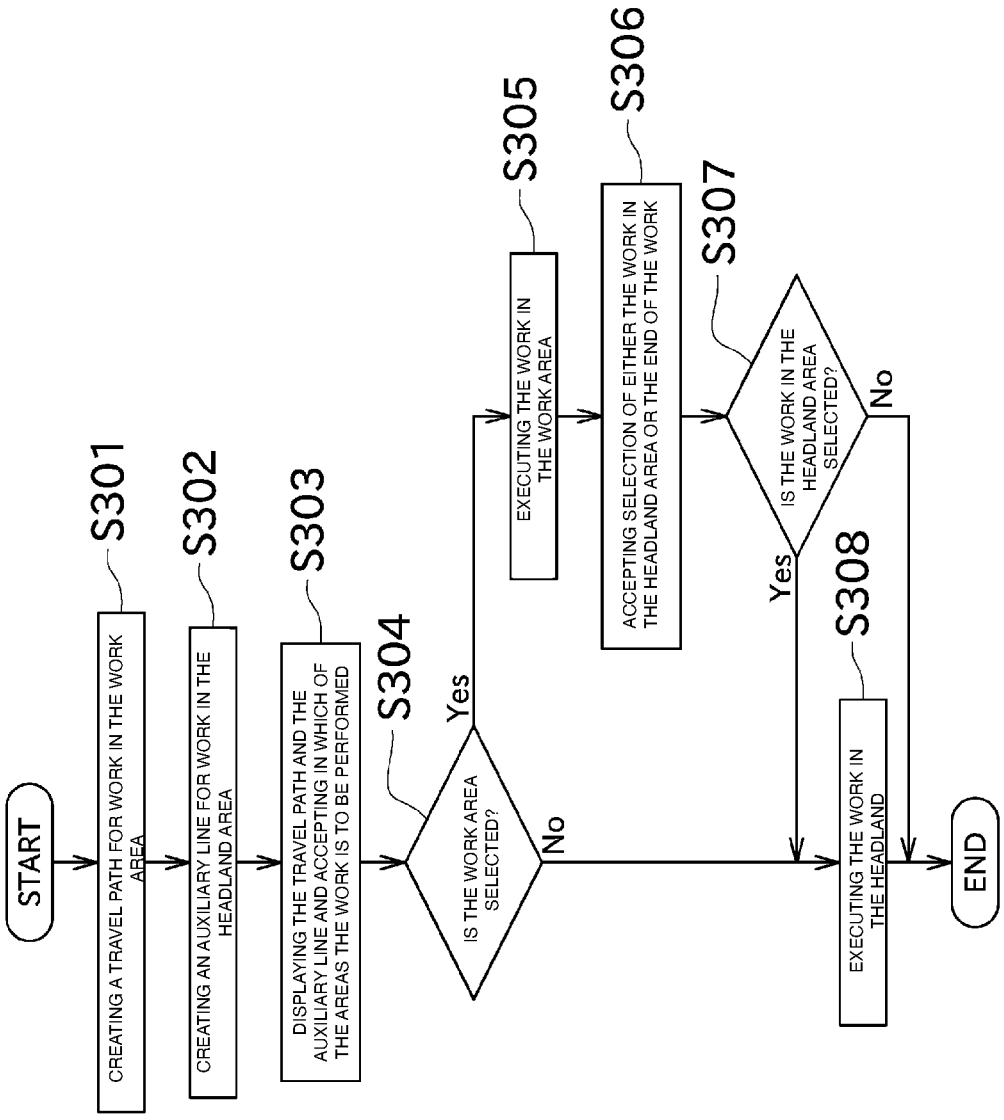
FIG. 11 is a flowchart illustrating the processing related to work in the work area and the headland area.
Figure 12:
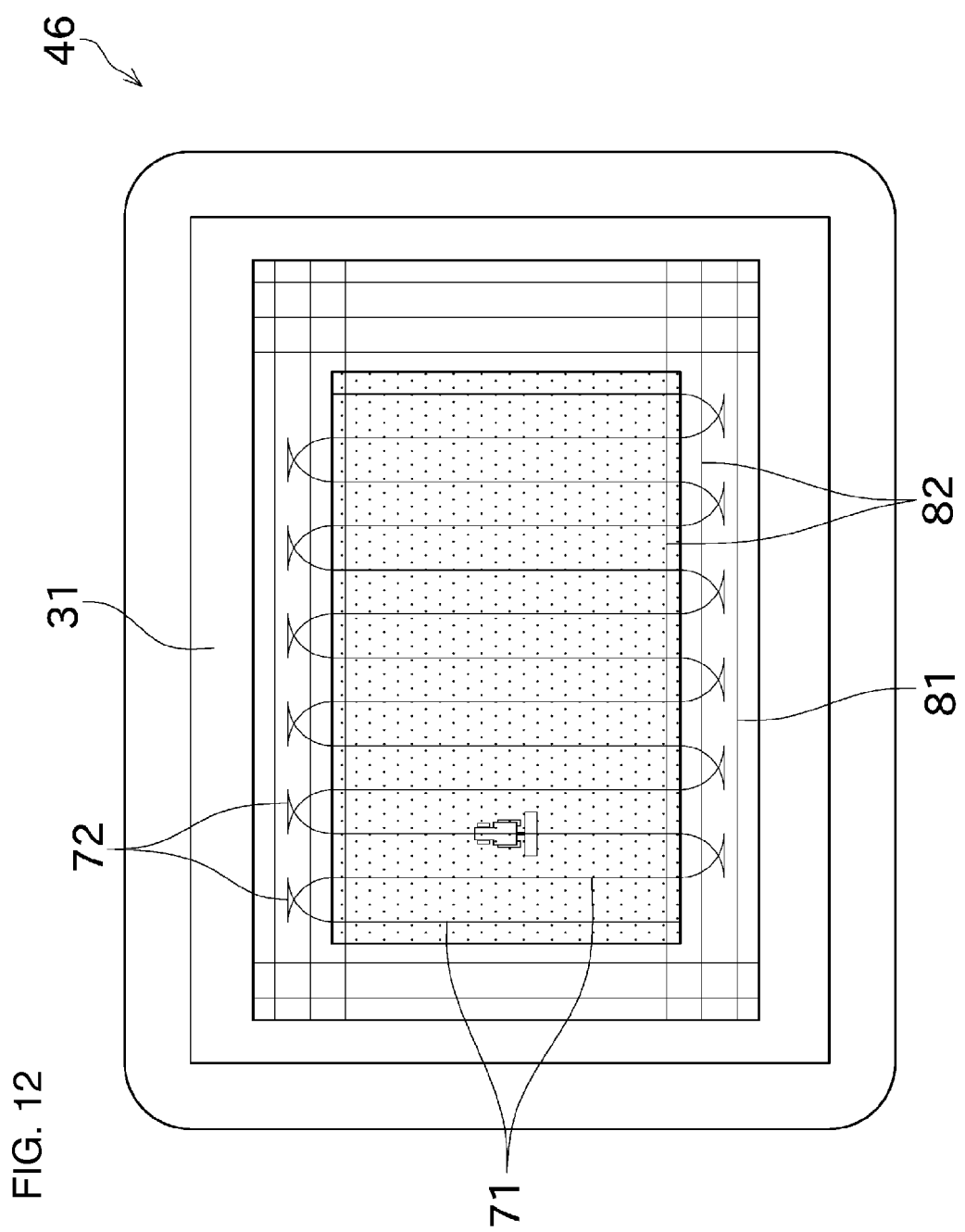
FIG. 12 is a diagram illustrating an image displayed on a wireless communication terminal after a path is created.

Next, with reference to FIG. 11 and FIG. 12, an explanation is given of a specific flow of processing related to the work in the work area and the headland area. FIG. 11 is a flowchart illustrating the processing related to the work in the work area and the headland area. FIG. 12 is a diagram illustrating an image displayed on the wireless communication terminal 46 after paths are created.

After a registration of a farm field is completed, the user inputs information for creating a path for work in the work area and the headland area (for example, the work width W1, the work machine width W2, the work machine type, the start position, the end position, etc.) to the wireless communication terminal 46. Thereafter, the travel path creation unit 35 creates a travel path for work in the work area (S301). Further, the reference auxiliary line creation unit 36 and the adjacent auxiliary line creation unit 37 create auxiliary lines for work in the headland area (S302). Note that, in a case where the processes of Steps S301 and S302 is performed in advance, the wireless communication terminal 46 skips the processes of Steps S301 and S302 and firstly performs the process of Step S303.

In Step S302, such a configuration in which the wireless communication terminal 46 creates both first auxiliary lines and second auxiliary lines and such a configuration in which the wireless communication terminal 46 creates either first auxiliary lines or second auxiliary lines are both possible. Note that, in a case where either of the auxiliary lines are to be created, it is possible that the wireless communication terminal 46 (auxiliary line selection unit 38) selects the auxiliary lines to be created. The wireless communication terminal 46 creates either of the auxiliary lines that are more suitable for the work machine 3 according to the type of the work machine 3 registered in advance. For example, in a case where the work machine 3 to be used is a tiller, since it is important to eliminate remaining work, the first auxiliary lines are selected and created. On the other hand, in a case where the work machine 3 to be used is a fertilizer applicator, since it is important to keep a constant work pitch even though remaining work occurs, the second auxiliary lines are selected and created.

Next, as illustrated in FIG. 12, the wireless communication terminal 46 (display control unit 33) displays the travel paths for work in the work area (the straight paths 71 and the turning paths 72) and the auxiliary lines for work in the headland area (the first reference auxiliary line 81 and the first adjacent auxiliary lines 82) on the display 31 (S303). For example, in Step S302, in a case where both first auxiliary lines and second auxiliary lines are created, the wireless communication terminal 46 displays either or both of the auxiliary lines on the display 31. Further, in a case of displaying either of the auxiliary lines, it is possible that the auxiliary line selection unit 38 selects the auxiliary lines to be displayed in the same manner as described above.

Further, the wireless communication terminal 46 (selection processing unit 39) displays a screen for asking the user in which of "work area" and "headland area" the work is to be performed and accepts the selection by the user (S303). Although there may be various display formats of this screen, for example, such a configuration in which the user is made to select an area (or a travel path or auxiliary line on an area) displayed as a figure on the display 31 as illustrated in FIG. 12 and such a configuration in which the user is made to select an item displayed with characters as "work area", "headland area", or the like are both possible. The user selects "work area" in a case where the work in the work area is not completed. On the other hand, the user selects "headland area" in a case where the work in the work area has already been completed.

In a case where it is determined that "work area" has been selected by the user (in a case of Yes in Step S304), the wireless communication terminal 46 executes the work in the work area (S305). Specifically, the tractor 1 (travel control unit 4a) is instructed to autonomously travel along the created travel paths (the straight paths 71 and turning paths 72). Note that, in a case where the work in the work area is performed, such a configuration in which whether a manned mode, in which the user boards the tractor 1, or an unmanned mode, in which the user does not board the tractor 1, can be further selected is also possible.

After the work in the work area is completed, the wireless communication terminal 46 (selection processing unit 39) displays a screen that allows the user to select either "work in the headland area" or "end of work" and accepts the selection by the user (S306). In a case where the user wishes to perform the work in the headland area currently, the user selects "work in the headland area". On the other hand, in a case where the user wishes to perform the work in the headland area later or in a case where the work in the headland area itself is unnecessary, the user selects "end of work".

In a case where it is determined that "work in the headland area" has been selected (in a case of Yes in Step S307), the wireless communication terminal 46 executes the work in the headland area (S308). Further, in a case where the "headland area" is selected in Step S304 (that is, in a case where "work area" is not selected/in a case of No in Step S304), the wireless communication terminal 46 executes the work in the headland area as well (S308). Specifically, the tractor 1 (the travel control unit 4a) is instructed to autonomously travel along the created first auxiliary lines (the first reference auxiliary line 81 and first adjacent auxiliary lines 82) or second auxiliary lines (the second reference auxiliary line 91 and second adjacent auxiliary lines 92). For example, in Step S302, in a case where both the first auxiliary lines and the second auxiliary lines are created by the wireless communication terminal 46, it is also possible that the auxiliary line selection unit 38 selects the auxiliary lines to be used in the work in the headland area as described above. Alternatively, it is also possible that the user is allowed to select on which of the first auxiliary lines and the second auxiliary lines the work is to be performed. In this case, the auxiliary line selection unit 38 performs a process of selecting either of the auxiliary lines according to the operation by the user on the touchscreen 32, etc.

In a case where the work in the headland area is completed and in a case where "end of work" is selected in Step S307, the work in the farm field by the tractor 1 is completed (suspend).

Figure 13:
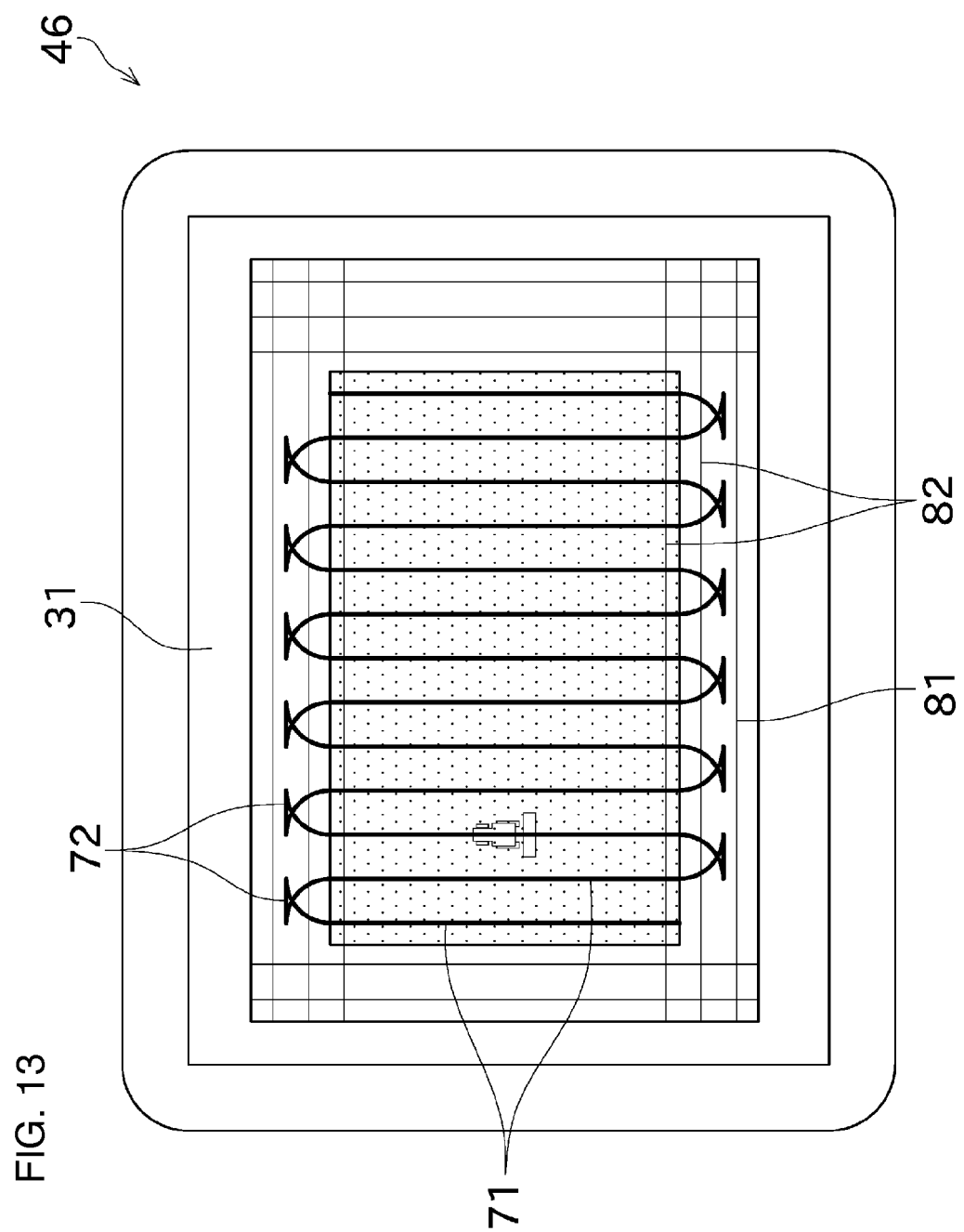
FIG. 13 is a diagram illustrating an image displayed on the wireless communication terminal while performing work in the work area.
Figure 14:
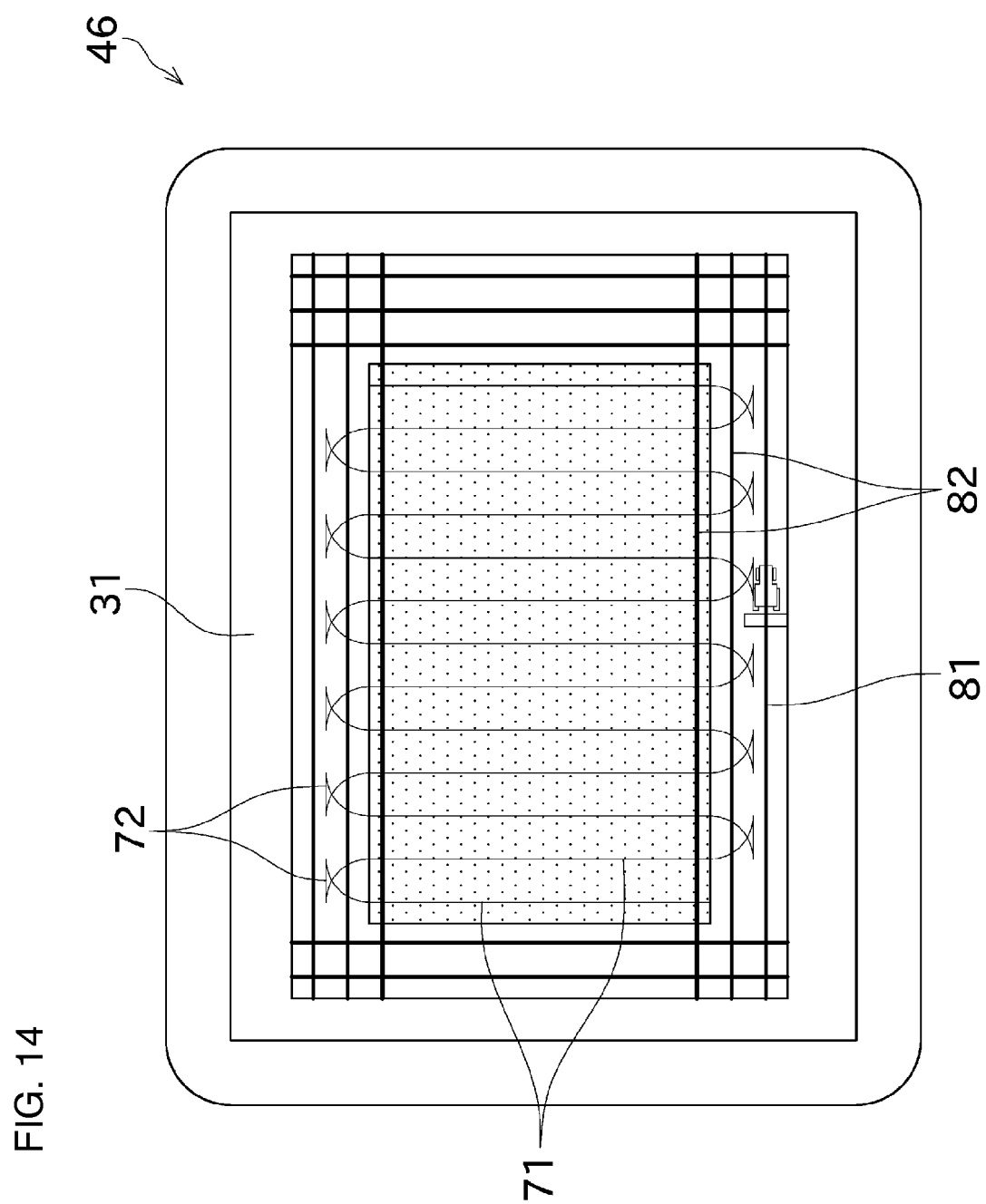
FIG. 14 is a diagram illustrating an image displayed on the wireless communication terminal while performing work in the headland area.

Next, with reference to FIG. 13 and FIG. 14, an explanation is given of the display of travel paths and auxiliary lines on the wireless communication terminal 46. Note that, in the following explanation, first auxiliary lines and second auxiliary lines are collectively referred to as auxiliary lines.

As illustrated in FIG. 13, in a case where the tractor 1 is autonomously traveling along travel paths, the travel paths and the auxiliary lines are displayed so that the travel paths are more conspicuous than the auxiliary lines. Although the travel paths are made conspicuous by thickening the line width in the example illustrated in FIG. 13, it is also possible to make the colors different or make the line types (solid line, broken line, chain line) different. On the other hand, in a case where the tractor 1 is autonomously traveling along auxiliary lines, the travel paths and the auxiliary lines are displayed so that the auxiliary lines are more conspicuous than the travel paths as illustrated in FIG. 14. Note that, even in a case where the tractor 1 is not traveling, the display formats for the travel paths and the auxiliary lines can be made different. Accordingly, it is easier for the user to check the paths.

As explained above, the autonomous travel system 100 of the present embodiment includes the farm field acquisition unit 34, the reference auxiliary line creation unit 36, the adjacent auxiliary line creation unit 37, and the travel control unit 4a. The farm field acquisition unit 34 acquires information of a farm field including a work area, in which a travel path for the tractor 1 on which the work machine 3 is mounted to autonomously travel to perform work is set, and a headland area, which is formed between the work area and the farm field peripheral edge. The reference auxiliary line creation unit 36 creates the first reference auxiliary line 81 in the headland area at a position that is distant inward from the farm field peripheral edge by the first reference interval T1, which corresponds to ½ of the work width W1 or ½ of the work machine width W2. The adjacent auxiliary line creation unit 37 creates a first adjacent auxiliary line 82 at a position that is distant inward from the first reference auxiliary line 81 by the auxiliary line interval S, which corresponds to the value obtained by subtracting the overlap amount R from the work width W1 or the value obtained by adding the work interval D to the work width W1. The total number of the first reference auxiliary lines 81 and the first adjacent auxiliary lines 82 to be created inside of a predetermined side of the farm field peripheral edge corresponds to the value obtained by rounding up the decimal spaces of the headland width L divided by the auxiliary line interval S. The travel control unit 4a causes the tractor 1 to autonomously travel along at least a part of the first reference auxiliary lines 81 and the first adjacent auxiliary lines 82.

Accordingly, by creating the first auxiliary lines with reference to the farm field peripheral edge and causing the tractor 1 to autonomously travel along the first auxiliary lines, it is possible to prevent remaining work from occurring in the headland area.

Further, the autonomous travel system 100 of the present embodiment includes the farm field acquisition unit 34, the reference auxiliary line creation unit 36, the adjacent auxiliary line creation unit 37, and the travel control unit 4a. The farm field acquisition unit 34 acquires information of a farm field including a work area, in which a travel path for the tractor 1 on which the work machine 3 is mounted to autonomously travel to perform work is set, and a headland area, which is formed between the work area and the farm field peripheral edge. The reference auxiliary line creation unit 36 creates the second reference auxiliary line 91 in the headland area at a position that is distant outward from the work area peripheral edge by the second reference interval T2, which corresponds to the value obtained by subtracting the overlap amount R from ½ of the work width W1 or the value obtained by adding the work interval D to ½ of the work width W1. The adjacent auxiliary line creation unit 37 creates a second adjacent auxiliary line 92 at a position that is distant outward from the second reference auxiliary line 91 by the auxiliary line interval S, which corresponds to the value obtained by subtracting the overlap amount R from the work width W1 or the value obtained by adding the work interval D to the work width W1. The total number of the second reference auxiliary lines 91 and the second adjacent auxiliary lines 92 to be created outside of a predetermined side of the work area peripheral edge corresponds to the value obtained by rounding down the decimal places of the headland width L divided by the auxiliary line interval S or the value obtained by subtracting 1 from that value. The travel control unit 4a causes the tractor 1 to autonomously travel along at least a part of the second reference auxiliary lines 91 and the second adjacent auxiliary lines 92.

Accordingly, by creating the second auxiliary lines with reference to the work area peripheral edge and causing the tractor 1 to autonomously travel along the auxiliary lines, it is possible to keep a constant work pitch in the headland area.

Further, in the autonomous travel system 100 of the present embodiment, the reference auxiliary line creation unit 36 is capable of creating the first reference auxiliary line 81 and is capable of creating the second reference auxiliary line 91 as well. The adjacent auxiliary line creation unit 37 is capable of creating the first adjacent auxiliary line 82 and is capable of creating the second adjacent auxiliary line 92 as well. Further, the autonomous travel system 100 further includes the auxiliary line selection unit 38 that selects the first reference auxiliary line 81 and first adjacent auxiliary lines 82 or selects the second reference auxiliary line 91 and second adjacent auxiliary lines 92. The travel control unit 4a causes the tractor 1 to autonomously travel along at least a part of the auxiliary lines selected by the auxiliary line selection unit 38.

Accordingly, it is possible to make the tractor 1 autonomously travel in the headland area, based on either first auxiliary lines with reference to the farm field peripheral edge or second auxiliary lines with reference to the work area peripheral edge.

Further, in the autonomous travel system 100 of the present embodiment, it is preferable that, in a case where the interval X between the second adjacent auxiliary line 92 and the farm field peripheral edge is narrower than ½ of the work width W1 or ½ of the work machine width W2, the adjacent auxiliary line creation unit 37 does not create the second adjacent auxiliary line 92 or delete the second adjacent auxiliary line 92 after creation.

Accordingly, it is possible to prevent a path on which the work machine 3 makes contact with the farm field peripheral edge or a path on which the work is performed outside the farm field from being created.

Further, the autonomous travel system 100 of the present embodiment includes the selection processing unit 39 that performs the process (S303) of allowing the user to select in which of the work area and the headland area the work is to be performed and performs the process (S306) of allowing the user to select whether the work in the headland area is to be performed or the work is to be ended. In a case where it is determined that the user has selected the work in the headland area, the travel control unit 4a causes the tractor 1 to autonomously travel along at least a part of the auxiliary lines created by the reference auxiliary line creation unit 36 and the adjacent auxiliary line creation unit 37.

Accordingly, it is possible for the user to make the tractor 1 autonomously travel in the headland area by performing a simple operation.

Although preferred embodiments of the present invention have been described above, the above-described configurations can be modified as described below, for example.

Although the wireless communication terminal 46 of the above-described embodiments has a function of creating both first auxiliary lines and second auxiliary lines, such a configuration having a function of creating either first auxiliary lines or second auxiliary lines is also possible.

In the above-described embodiment, the work in the headland area is performed using either first auxiliary lines or second auxiliary lines. Alternatively, it is also possible to make the work in the headland area performed by use of an auxiliary line created in another method (for example, an auxiliary line drawn equally distant from the farm field peripheral edge and the work area peripheral edge). Therefore, it is possible to make the wireless communication terminal 46 perform the process of each step illustrated in FIG. 11 by use of various auxiliary lines for a headland. Further, it is also possible that the selection processing unit 39 performs the process of only one of Step S303 and S306.

DESCRIPTION OF REFERENCE NUMERALS 1 tractor (work vehicle)
34 farm field acquisition unit
35 travel path creation unit
36 reference auxiliary line creation unit (auxiliary line creation unit)
37 adjacent auxiliary line creation unit (auxiliary line creation unit)
38 auxiliary line selection unit
39 selection processing unit
46 wireless communication terminal

The invention claimed is:

1. An autonomous travel system comprising:
a farm field acquisition unit that obtains information of a farm field including a work area, in which a travel path for a work vehicle on which a work machine is mounted to autonomously travel to perform work is set, and a headland area, which is formed between the work area and a farm field peripheral edge;
a reference auxiliary line creation unit that creates a first reference auxiliary line in the headland area at a position that is distant inward from the farm field peripheral edge by a first reference interval, which is ½ of a work width or ½ of a work machine width;
an adjacent auxiliary line creation unit that creates a first adjacent auxiliary line at a position that is distant inward from the first reference auxiliary line by an auxiliary line interval, which is a value obtained by subtracting an overlap amount from the work width or a value obtained by adding a work interval to the work width, wherein a total number of the first reference auxiliary line and first adjacent auxiliary lines to be created inside of a predetermined side of the farm field peripheral edge is a value obtained by rounding up decimal places of L/S if a headland width, which is a distance from the farm field peripheral edge to the work area, is L and the auxiliary line interval is S; and
a travel control unit that causes the work vehicle to autonomously travel along at least a part of the first reference auxiliary line and first adjacent auxiliary lines.

2. The autonomous travel system according to claim 1, wherein the reference auxiliary line creation unit is capable of creating the first reference auxiliary line and is capable of creating a second reference auxiliary line in the headland area at a position that is distant outward from a work area peripheral edge by a second reference interval, which is a value obtained by subtracting an overlap amount from ½ of the work width or a value obtained by adding a work interval to ½ of the work width, and
wherein the adjacent auxiliary line creation unit is capable of creating the first adjacent auxiliary line and is capable of creating a second adjacent auxiliary line at a position that is distant outward from the second reference auxiliary line by an auxiliary line interval, and a total number of the second reference auxiliary line and second adjacent auxiliary lines to be created outside of a predetermined side of the work area peripheral edge is a value obtained by rounding down decimal places of L/S or a value obtained by subtracting 1 from the value obtained by rounding down decimal places of L/S;

wherein the autonomous travel system further comprises an auxiliary line selection unit that selects the first reference auxiliary line and first adjacent auxiliary lines or to select the second reference auxiliary line and second adjacent auxiliary lines; and wherein the travel control unit causes the work vehicle to autonomously travel along at least a part of the auxiliary lines selected by the auxiliary line selection unit.

3. The autonomous travel system according to claim 1, wherein the autonomous travel system comprises a selection processing unit that performs a process of allowing a user to select in which of the work area and the headland area the work is to be performed and a process of allowing the user to select whether the work in the headland area is to be performed or the work is to be ended, and wherein, in a case where it is determined that the user has selected the work in the headland area, the travel control unit causes the work vehicle to autonomously travel along at least a part of the auxiliary lines created by the reference auxiliary line creation unit and the adjacent auxiliary line creation unit.

4. An autonomous travel system comprising:

a farm field acquisition unit that obtains information of a farm field including a work area, in which a travel path for a work vehicle on which a work machine is mounted to autonomously travel to perform work is set, and a headland area, which is formed between the work area and a farm field peripheral edge;

a reference auxiliary line creation unit that creates a second reference auxiliary line in the headland area at a position that is distant outward from a work area peripheral edge by a second reference interval, which is a value obtained by subtracting an overlap amount from ½ of a work width or a value obtained by adding a work interval to ½ of the work width;

an adjacent auxiliary line creation unit that creates a second adjacent auxiliary line at a position that is distant outward from the second reference auxiliary line by an auxiliary line interval, which is a value obtained by subtracting the overlap amount from the work width or a value obtained by adding the work interval to the work width, wherein a total number of the second reference auxiliary line and second adjacent auxiliary lines to be created outside of a predetermined side of the work area peripheral edge is a value obtained by rounding down decimal places of L/S or a value obtained by subtracting 1 from the value obtained by rounding down decimal places of L/S if a headland width, which is a distance from the farm field peripheral edge to the work area, is L and the auxiliary line interval is S; and a travel control unit that causes the work vehicle to autonomously travel along at least a part of the second reference auxiliary line and second adjacent auxiliary lines.

5. The autonomous travel system according to claim 4, wherein, in a case where an interval between the second adjacent auxiliary line and the farm field peripheral edge is narrower than ½ of the work width or ½ of the work machine width, the adjacent auxiliary line creation unit does not create the second adjacent auxiliary line or deletes the second adjacent auxiliary line after creation.

6. An autonomous travel system comprising:

a farm field acquisition unit that obtains information of a farm field including a work area, in which a travel path for a work vehicle on which a work machine is mounted to autonomously travel to perform work is set, and a headland area, which is formed between the work area and a farm field peripheral edge;

an auxiliary line creation unit that creates an auxiliary line for causing the work vehicle to autonomously travel in the headland area;

a selection processing unit that performs a process of allowing a user to select in which of the work area and the headland area the work is to be performed and a process of allowing the user to select whether the work in the headland area is to be performed or the work is to be ended; and a travel control unit that causes the work vehicle to autonomously travel along at least a part of the auxiliary line created by the auxiliary line creation unit in a case where it is determined that the user has selected the work in the headland area.

* * * * *